(No Model.)
E. H. ROBBINS.
PIPE WRENCH.
No. 282,372. Patented July 31, 1883.
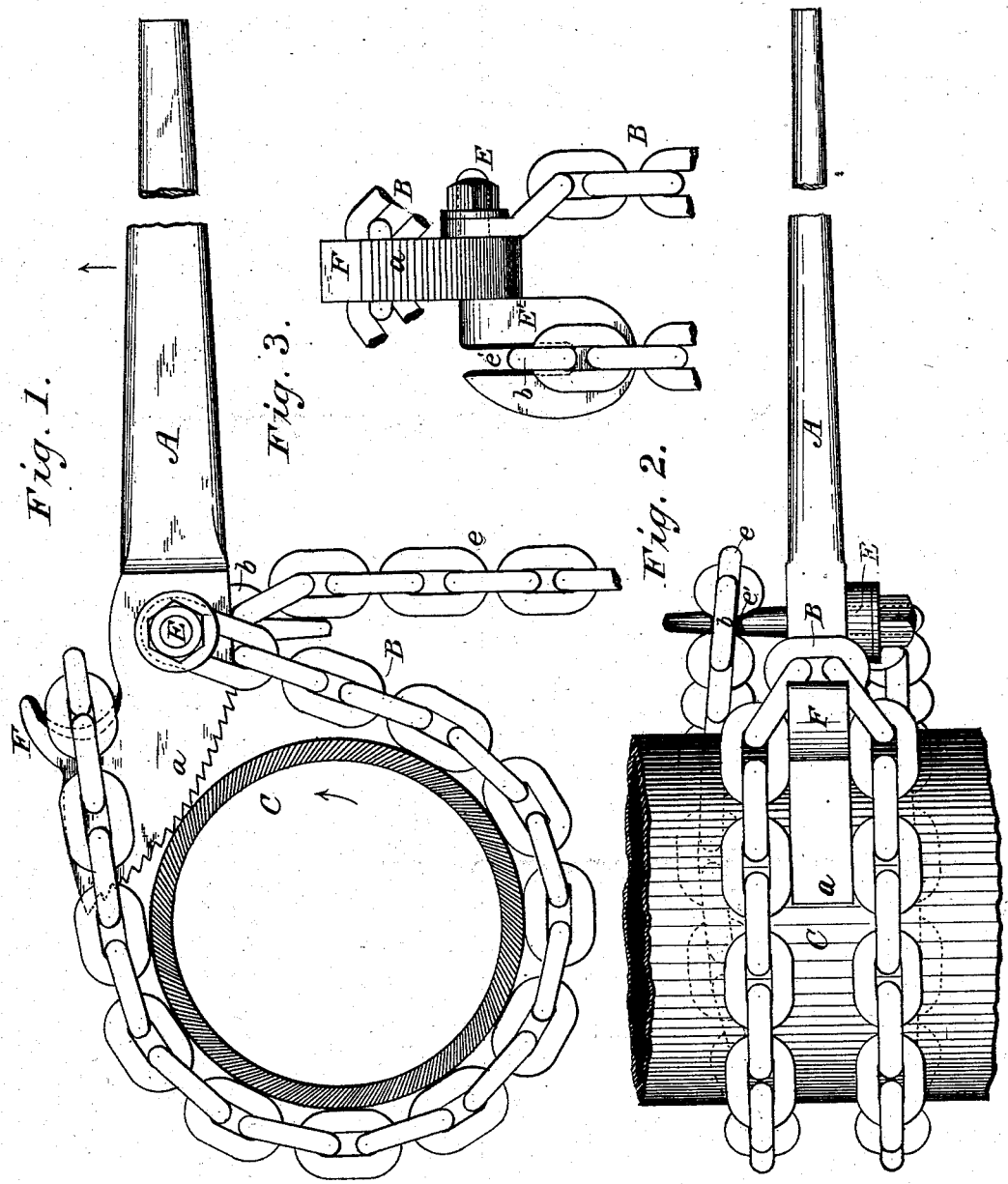
Witnesses:
Wm. A. Skinkle
Geo. W. Breck
Inventor:
Eugene H. Robbins.
by his Attorney,
Frank L. Pope

UNITED STATES PATENT OFFICE.

EUGENE H. ROBBINS, OF PITTSFIELD, MASSACHUSETTS.

PIPE-WRENCH.

SPECIFICATION forming part of Letters Patent No. 282,372, dated July 31, 1883.

Application filed June 9, 1882. (No model.)

*To all whom it may concern:*

Be it known that I, EUGENE H. ROBBINS, a citizen of the United States, and a resident of Pittsfield, in the county of Berkshire and State of Massachusetts, have invented certain new and useful Improvements in Pipe-Wrenches, of which the following is a specification.

In Letters Patent of the United States granted to me May 2, 1871, and numbered 114,348, I have described and claimed a pipe-wrench consisting of a rigid bar or lever having a chain attached by one extremity thereto, at a point near that end of the lever which bears against the pipe, and constitutes the fulcrum upon which it moves. The free end of the chain is wrapped around the pipe which is to be operated upon, and is secured to a claw upon the lever. When the handle of the lever is turned in one direction, the grasp of the chain upon the pipe is tightened until the pipe itself is caused to turn with the chain; but when the lever is turned in the opposite direction the grasp of the chain is relaxed, allowing it to slip over the surface of the pipe. In a wrench of this construction the strain upon the chain is inversely proportional to the size of the pipe operated upon, while the strain upon the lever, when a given power is applied thereto, is constant without reference to the diameter of the pipe. Hence it is necessary to make use of a proportionately stronger chain on the smaller sizes of pipes; but if a chain be made larger in proportion to the lever, so as to possess sufficient strength for use upon small pipes, it becomes clumsy and inconvenient to handle, and the links are so large as not to admit of sufficiently-accurate adjustment.

My present invention consists in constructing a chain-wrench in such a manner that a single chain may be doubled into a loop or bight and passed around the pipe, when of small diameter, thus dividing the strain between two lengths of the chain, and securing double the available tensile strength without increasing the size of the chain beyond that which is adapted for use upon the larger sizes of pipe.

In the accompanying drawings, Figure 1 is a side elevation of a chain-wrench embodying my improvements and showing the method of applying it to a section of a small pipe, and Fig. 2 is a plan view of the same. Fig. 3 shows certain details of construction.

Referring to the drawings, A represents the lever of the wrench, and B the chain as applied to a piece of pipe, C. The lever A is curved at the fulcrum end $a$, where it bears against the pipe, and is preferably serrated, to prevent it from slipping upon the surface thereof. At a short distance from the curved end of the lever, and upon one side thereof, is secured, by means of a bolt, E, or other equivalent means, one end of the chain B, which may be of sufficient length to pass twice around the largest-sized pipe to which it may be desired to apply it. The remaining or free end $e$ of the chain B is not permanently fastened to the lever A, but may be temporarily secured thereto at any point in its length by placing one of its links, as at $b$, in a slot, $e'$, of a holder or clamp, E', upon the opposite side of the lever A, which may form an extension of the bolt E. Upon the back of the lever, and near its end, is a device—such as a projection or claw, F—for grasping the bight or loop of the doubled chain, as hereinafter explained. A slot cut crosswise in the lever would serve the same purpose. The wrench may be applied to a large pipe by simply carrying the chain B once around the same and securing the free end by placing one of the links in the slot $e'$, the operation being substantially the same as that set forth in my former Letters Patent, hereinbefore referred to.

The manner of applying the instrument to a small pipe is as follows: The curved end $a$ of the lever A is made to rest at a point near its extremity against the surface of the pipe C, as shown in Fig. 1. The chain is then passed under and around the pipe, and over the projection F upon the lever, and thence back underneath the pipe. It is then drawn up tightly by its free end and secured by dropping one of its links into the slot $e'$ of the clamp E'. If the lever A now be raised up, the chain will be tightened around the pipe by the pull of the lever upon the bolt E and the clamp E', to which the ends of the doubled chain are respectively secured, the bight or loop thereof being held by the projection F. As the chain is free to move laterally upon the projection F, the strain will divide itself equally between the two parallel lengths of the doubled chain, and when the chain is sufficiently tight the pipe will be turned with the lever and chain and in the same direction. By moving the bar in the opposite direction the grasp of the chain upon the pipe may be loosened and a new hold obtained thereon.

I am aware that it is not new to construct a pipe-wrench having two independent chains for encircling the pipe, and I make no claim to this specific device.

I claim as my invention—

1. In a chain-wrench, the combination, with the lever A, having a serrated jaw, and provided with the claw F at its outer extremity, of a chain, B, the bolt E, for permanently securing one end of said chain, and the slotted clamp E', adapted to lock the free end of said chain at any desired point, and thereby to determine the length of the operative loop, as set forth.

2. In a chain-wrench, the combination, with a suitable hand-lever, of the bolt E, passing therethrough, and adapted to secure a chain against one side thereof, and the slotted clamp E' at its opposite side, as set forth.

In testimony whereof I have hereunto subscribed my name this 29th day of May, A. D. 1882.

EUGENE H. ROBBINS.

Witnesses:
WILLIAM W. GAMWELL,
ARTHUR A. LOOP.